Patented Feb. 19, 1952

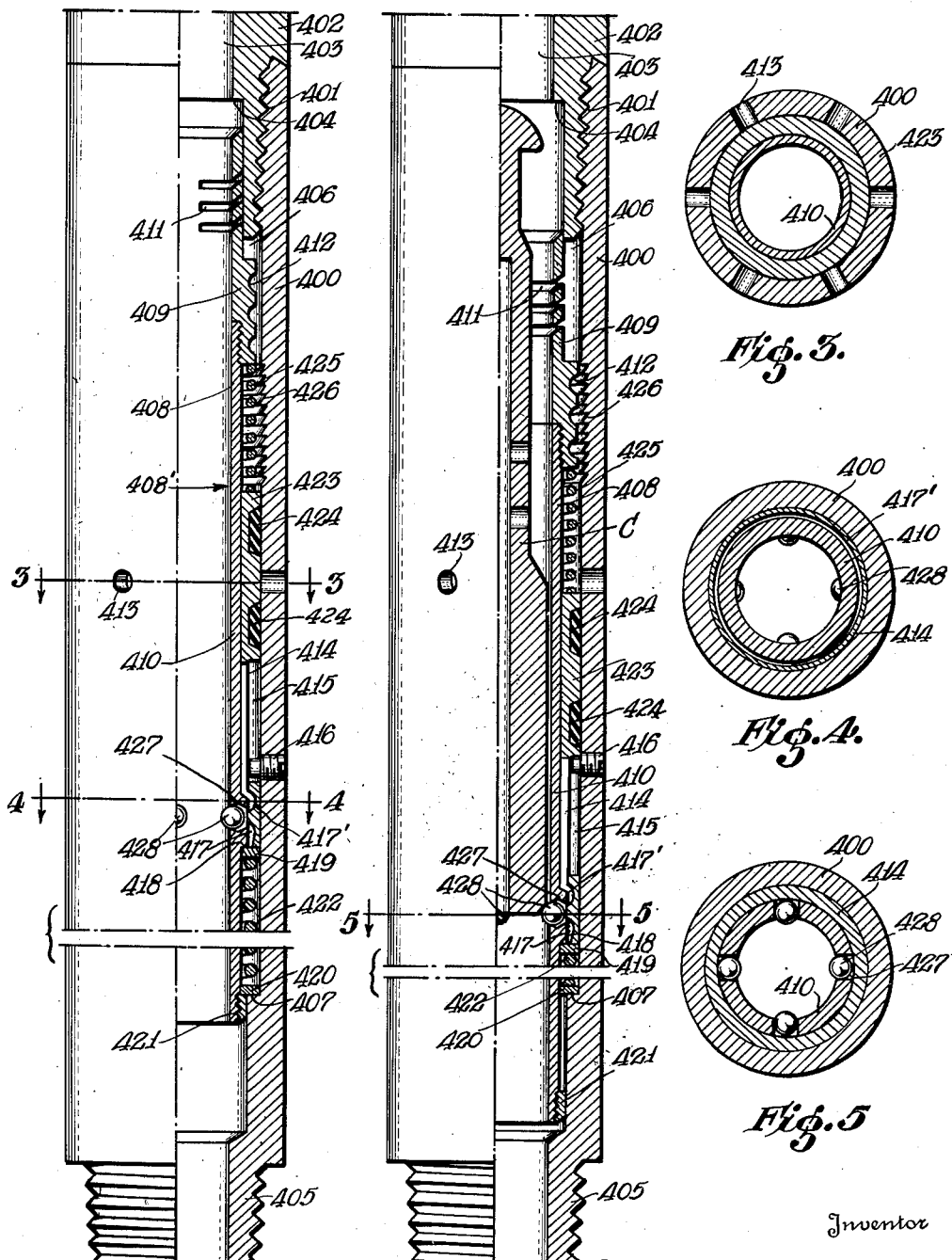

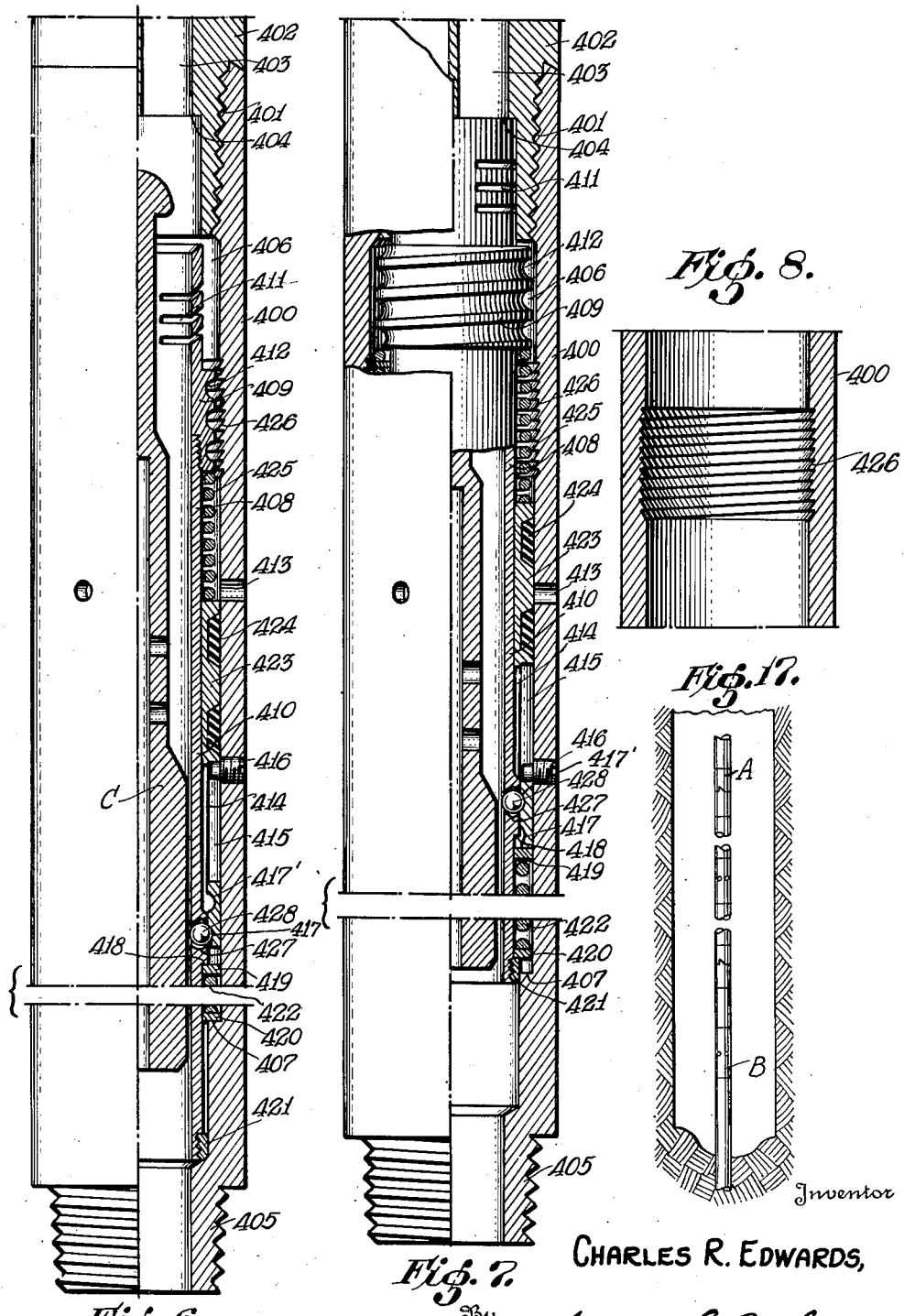

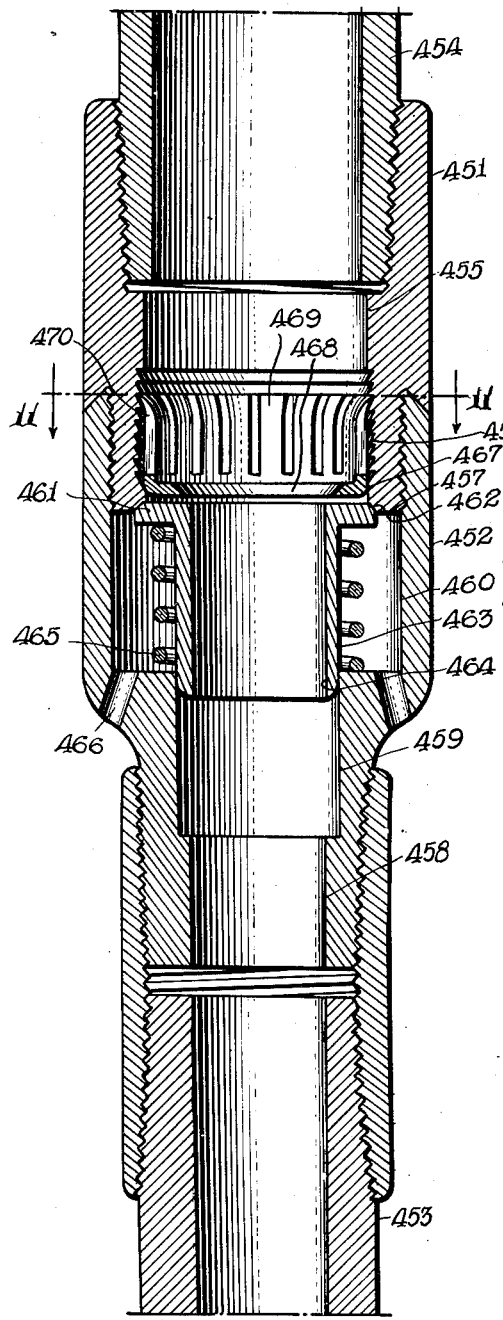
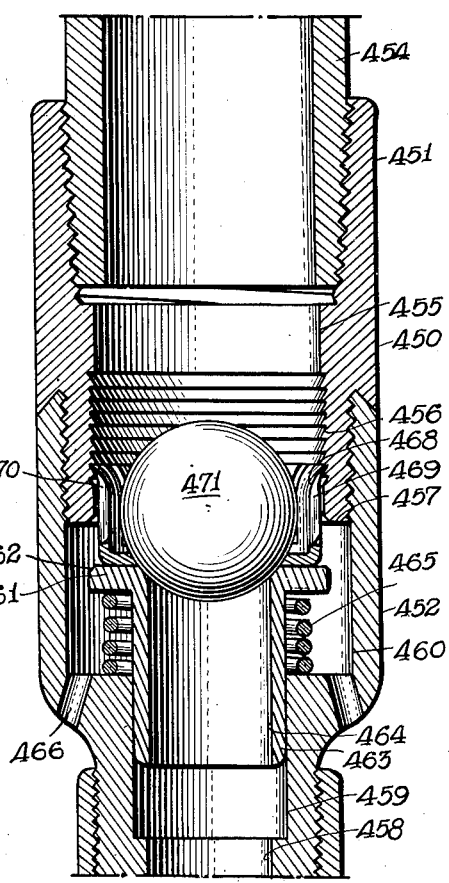
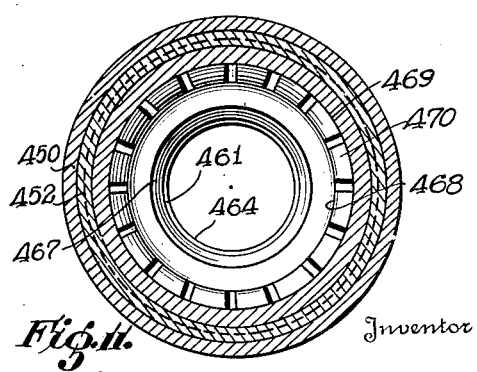

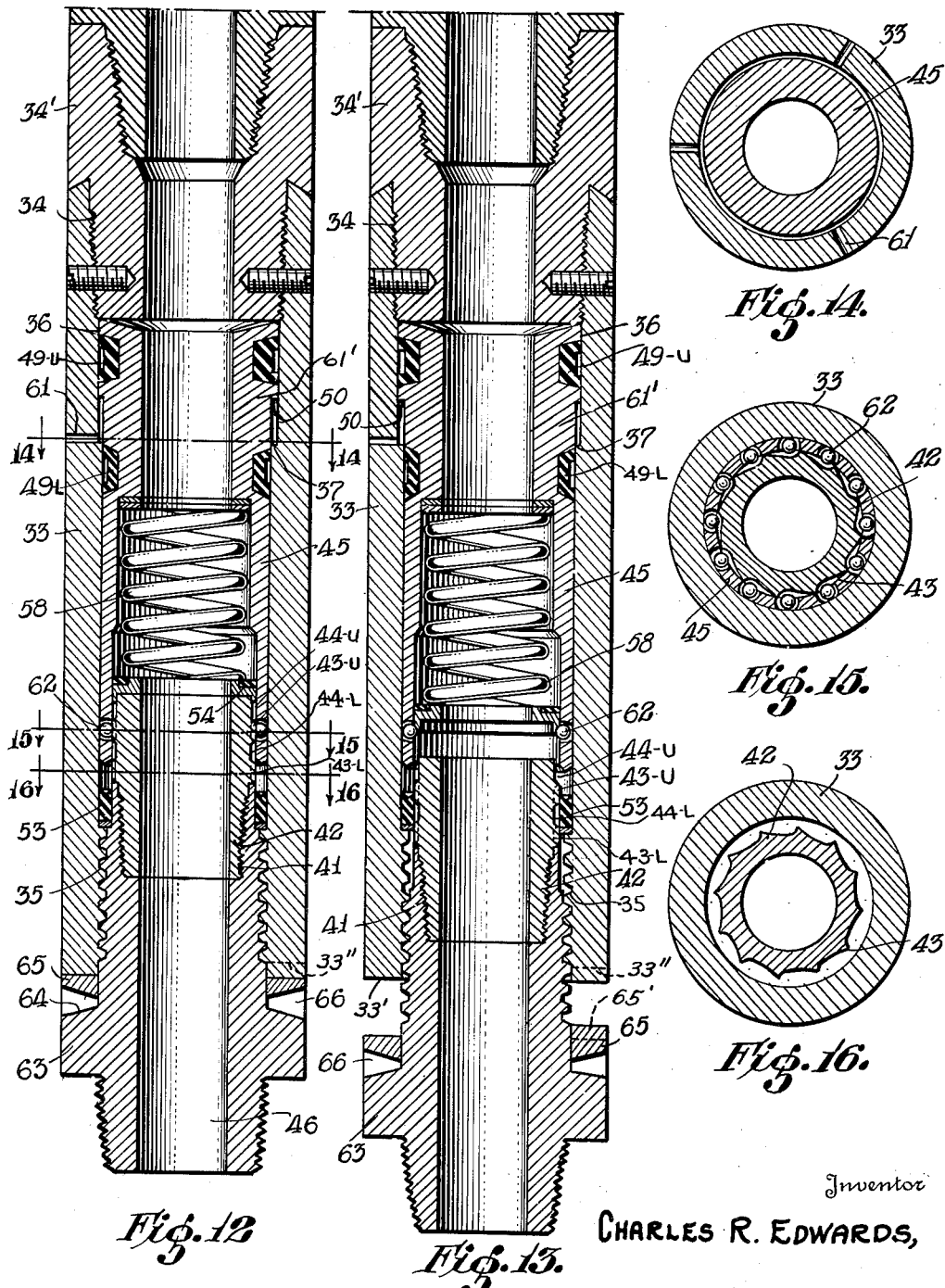

2,586,015

UNITED STATES PATENT OFFICE 2,586,015

PIPE RELEASING MEANS

Charles R. Edwards, Houston, Tex.; Frances Robertha Edwards executrix of said Charles Ross Edwards, deceased Original application May 13, 1940, Serial No. 334,947. Divided and this application April 27, 1945, Serial No. 590,682

9 Claims. (Cl. 255—28)

This invention relates to new and useful improvements in means for recovering elements from well bores.

The former practice has been to attempt to remove the lodged or stuck portion of the drill pipe, which is commonly referred to as the "fish," by grappling the pipe and pulling on the same with very powerful machinery, which often seriously damages the pipe by over straining the upper portion of the pipe until the pipe is broken near the surface. Such breaking of the pipe causes the elastic stretch in that portion of pipe below to snap the lower portion of pipe downwardly with great force and most generally "corkscrews" this pipe and bends it over in the "cave-outs" and cavities, thereby damaging the same. After this happens, cutters, shooting, left-hand pipe, and other "fishing" tools are tried in an attempt to recover the pipe. The long sections of pipe are connected together by threaded collars or threaded tool joints. Sometimes the top of the lodged portion of pipe has been rotated to the left to affect disconnection of one of the many threaded joints, but when this is done, there is no way of determining which joint will be unscrewed. A joint at the top of the well, or only a few hundred feet from the surface of the ground will be broken out, because ordinarily the lower joints are made tighter due to the bit drag on said joints during the drilling operation. For this reason, merely rotating the pipe to unscrew the joints is not successful since it leaves the major portion of the pipe in the bore.

There are so many different conditions which may arise to make the removal of this lodged pipe difficult that no one device, now in use, in applicant's opinion may successfully take care of all of these conditions. Up to the present time, there has been no method which will efficiently and positively remove or "fish out" pipe, or other elements, from the well bore, regardless of the position of the pipe and regardless of the particular conditions which caused the necessity for the "fishing" job or of the particular conditions encountered during the attempt to remove said pipe.

It is therefore, one object of this invention to provide an improved means for recovering and removing pipe, tubing, casing and other objects which may have become lodged, or which may have fallen downwardly, within a well bore.

An important object of the invention is to provide an improved means for recovering and removing pipe, tubing, or the like, from a well bore which contemplates a plurality of combined devices. For example, I contemplate combining one or more safety joints with one or more circulation breakers so that at least a section of stuck pipe may be removed under almost any conditions. In particular, it is contemplated, where the safety joints are combined with circulation breakers, the circulation breakers will be placed below the safety joints.

Another object of the invention is to provide an improved circulation device for reestablishing circulation around the walls of a string of pipe, or the like, in which it is connected, whereby circulation may be established when the portion of the pipe below the circulation device has become stuck in the well bore.

A further object of the invention is to provide an improved circulation device for reestablishing circulation through the wall of a string of pipe into which it is connected, and in which the inside diameter is not restricted so as to prevent the passage of tools and other objects that will pass through the string of pipe.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an enlarged, vertical sectional view, showing a circulation breaker in its inoperative position.

Fig. 2 is a view similar to Fig. 1, showing the circulation breaker of Fig. 1 in its operative position.

Fig. 3 is a horizontal cross-sectional view taken on the line 3—3 of Fig. 1,

Fig. 4 is a horizontal cross-sectional view taken on the line 4—4 of Fig. 1,

Fig. 5 is a horizontal cross-sectional view taken on the line 5—5 of Fig. 2,

Fig. 6 is a view, partly in section and partly in elevation, showing how a tool may be run down through the device, Fig. 7 is a view similar to Fig. 6, showing how a tool may be pulled up through the device, Fig. 8 is a vertical sectional view, showing the fluid agitating means of the housing, Fig. 9 is a vertical, sectional view of another form of circulation device, Fig. 10 is a view similar to Fig. 9, showing said circulation device in its open position, Fig. 11 is a horizontal cross-sectional view taken on line 11—11 of Fig. 1, Fig. 12 is an enlarged vertical, sectional view, showing a safety joint, Fig. 13 is a view similar to Fig. 12, showing the safety joint of Fig. 12 in its unlocked position, Fig. 14 is a horizontal cross-sectional view taken on line 14—14 of Fig. 12, Fig. 15 is a horizontal cross-sectional view taken on line 15—15 of Fig. 12, Fig. 16 is a horizontal cross-sectional view taken on line 16—16 of Fig. 12.

Fig. 17 is an elevation showing a series of circulation breakers and safety joints in a string of pipe.

In the drawings, Figs. 1–16 show various means and combinations whereby a stuck pipe may be removed from the bore of a well. There has been shown selectively operated safety joints in Figs. 12 to 16 which may be operated from the surface of the well. These safety joints are placed at intervals in the string of drill pipe and the lock on each safety joint may be selectively unlocked. For example, the lowermost lock could be operated from the surface to unlock, and if it would not rotate so as to disconnect the stuck pipe, then the next higher selective safety joint could be unlocked so as to operate the next safety joint; and so on up the string of tubes until a safety joint was reached which could be both unlocked and released. These safety joints will be hereinafter described.

There is provided for such oil wells, as well as for other wells such as brine, gas or water wells, Circulation Breakers for use in reestablishing circulation by short stages from the top of the sticking material on down to the bottom of the stuck string of drill pipe or tubing. These circulation breakers may also often be advantageously located immediately below a safety joint, the purpose being that so located, the safety joint just immediately above the breaker can then be released when it is found that the reestablishment of circulation cannot release the stuck string down to some lower joint or to the bottom of the stuck string. It will be understood that it is always very desirable to maintain the inside diameter of any inserted device in any string of pipe, or of tubing, at a uniform diameter not smaller than the smallest inside diameter of such pipe or tubing; or at the very least not to vary such diameters to such an extent as to interfere with the ordinary withdrawal of core barrels and other devices that may be run in drill stems or with the pump parts that may be desired to operate and run through tubing. It is to be understood that the present safety joints and circulation breakers will not interfere with such operations of running other devices inside the strings of pipe, or of tubing, that may become stuck. At times when there are circulation breakers in the string of pipe or tubing, and even when circulation has been reestablished, it will be found that the stuck string cannot be released because the circulation may have channeled around through a crevice or up one side.

*Safety joint*

In Figs. 12 to 16, there is shown an example of one form of safety joint. The numeral 33 designates a housing or an elongated hollow sleeve, which is internally screw-threaded at its upper end 34 to receive the pin 405 of Figs. 1 and 2 or, as illustrated in Figs. 12 and 13 a tool joint pin 34' on a pipe section. The lower end of housing 33 is internally screw-threaded with a square or acme type thread 35 of coarse pitch and steep lead. Also the housing 33, below the lower coarse threads 35, is provided with a cylindrical cam-shaped ratchet 33' having a tooth or stop 33'' on its lower annular face, as is indicated in Figs. 12 and 13. The object of this is to prevent further forward rotation of the safety thread 35 after the abutting tooth or stop face 65' of the complementary cam or ratchet 65 of the hollow pin 63 has contacted the coacting stop face 33'' of the ratchet on the housing 33. In Fig. 12 it will be noted that the ratchet teeth 33'' and 65 engage and that the coarse threads 35 are made up, whereas in Fig. 3 it will be observed that these threads are partially unscrewed and that the ratchet teeth are not engaged with the part 65. This part 65 may be integral with the pin 63, but for convenience in manufacture and assembly the part 65 may take the form of a separate ring which is welded to the pin 63 by welding in the circular space 66. The housing 33 is provided with an axial bore 36, and the central portion of said bore is slightly reduced so as to provide a shoulder 37 therein. Attached to the lower end of the housing 33 is a pin 63 which has its upper end externally screw-threaded so as to correspond to and coact with the screw threads 35. Its lower end 39 is externally screw-threaded so as to receive a tool joint (not shown). The pin 63 is provided with an axial bore 46, and the upper end of said pin is screw-threaded at 41 so as to receive the clutch nipple 42. The outer surface of said clutch nipple is provided with a plurality of wedge cams 43—U and 43—L, and in the space between the rows of wedge cams 43—U and 43—L is a ball raceway 44—L (Figs. 12 and 13). Another ball raceway 44—U is located above cams 43—U. Surrounding the clutch nipple 42, and extending upwardly, is a slidable sleeve 45 which snugly engages the inner surface of the member 33, and is movable within the bore 36. The lower end of said sleeve 45 is provided with a plurality of openings and confined within said openings are locking balls 62. The hollow sleeve 45 is circumferentially grooved so as to receive a packing ring 49—U. The sleeve 45 movably engages the upper surface of the enlarged part of the bore 36, and is provided with a shoulder 50 which corresponds to and coacts with the shoulder 37 of the housing 33. The upper end 61' of the sleeve 45 provides a piston head and is externally grooved to receive a second packing ring 49—L which is insertable therein. A slidable ring 54 overlies the top of the clutch nipple 42 and engages same when 45 moves downwardly.

The lower beveled edge of the ring 54 acts as a ball retainer for the balls 62 when the safety threads 35 are released. The coil spring 58 is confined above by the reduced bore of piston head 61' and below by ring 54.

One or more, preferably several, of these safety joints generally indicated by A, Fig. 17, may be inserted, as indicated above, at short intervals in that part of a string of pipe or of tubes that later in use may become lodged or stuck in a bore. A suitable number of these joints are assembled with variously tensioned springs in each of the joints, and the joints may be made up into a string of pipe in such a manner that the joint at the bottom will have the weakest spring 58, and the next joint above in the string will be the next weakest and will increase the tension so that the top joint will have the strongest spring 58.

When the first joint is made up in a string and before the fluid pressure within is higher than without this joint, and when such pressure has not become so great as to compress the springs 58 by forcing the sleeve 45 downwardly, then the springs 58 will urge the sleeve 45 upwardly until the top of the piston head 61' will bear upwardly against the lower end of the pin 34'. In this elevated position of the sleeve 45, the locking balls 62 will also be elevated, and will be engaged in the upper row of clutch cams 43—U so as to prevent reverse rotation to unscrew the safety threads 35. When the surface pump is running so as to remove the cuttings from the bit, as in drilling, then the differences in pressure between the inside and outside of the joint will be so great as to compress the springs 58 in all the safety joints, and then the sleeve 45 will be forced down until the shoulder 50 of said sleeve is resting on the shoulder 37 of the housing 33; said locking balls 62 will also be lowered and will be in engagement with the lower row of clutch cams 43—L and in this position, the joint will be locked so as to prevent reverse rotation to unscrew the safety threads 35 while drilling.

When it is desired to unlock any particular safety joint, preparatory to unscrewing the safety threads 35, and to release this particular safety joint, an intermediate fluid pressure is attained by the pumps until the inside pressure is sufficiently greater than the outside pressure at this particular joint to partially move the sleeve 45 downwardly until the locking balls move into the lower ball raceway 44—L. With the parts in this position, the safety joint can be slightly rotated in a reverse or counterclockwise direction as seen from the top of the well, and will be partially unlocked to such an extent that now the upper part of the joint can be turned in a reverse direction until the locking balls 62, along with the sleeve 45 and the upper part of the joint, have been relatively elevated up far enough so that the locking balls will be forced up into the upper row of clutch cams and will prevent, for the time, any further reverse rotation. The pump is stopped or the fluid pressure within the joint is released, which will then permit the spring 58 to expand upwardly to lift the sleeve 45 and move the locking balls 62 to above the upper row of clutch cams 43, at which time the upper part of the joint may be further rotated in a counterclockwise direction until the threads 35 are completely unscrewed, and at such time the joint will have been released so that everything above pin 63 can then be withdrawn from the well. However, if for any reason it was found desirable to reconnect the joint, it could be done without coming out of the well to reset any of the parts thereof. Also, it will be seen that all three of the packings and all parts of the joint are removed from the lower portion of the joint, except the lower portion 63 of the joint which is left in the well. It will be observed that because it is necessary not only to have an intermediate fluid pressure to operate the locking means, but that it is necessary to operate with a number of variations in pressure as described above, it might be said that the lock is a combination lock and substantially all possibilities of the joint becoming unlocked and released during normal operations in a bore hole are eliminated. Also, it will be seen that such a safety joint is very strong, and that it is no longer necessary, to lose any of the parts of the lock or packings at any time.

*Circulation breakers*

As pointed out hereinbefore, some type of circulating breaker or by-pass valve device would be desirable to be placed in a string of drill stem, or of other tubing, when the same is run into a well bore, and, in the event such pipe became stuck within the well bore, it may be possible to free said pipe by operating said circulating breakers. In Figs. 1 to 8, inclusive, there has been shown one type of a circulating breaker. The circulation breaker is preferably of the same inside and outside diameters as the inside and outside of the tubing and therefore does not produce a reduction or an enlargement within the string. The upper end 401 of the housing 400 is internally screw-threaded, and receives an adapter 402 which has an axial bore 403 therein. This adapter 402, at its upper end, is connected to a section of the drill stem or tubing. The lower inner portion of said adapter is enlarged and forms a shoulder 404. The lower end of the housing 400 is reduced and externally screw-threaded, forming a pin 405 onto which a safety joint, for example the one shown in Fig. 12, a tool joint box (not shown) or the collar of any ordinary tubing (not shown) may be connected. The housing 400 is provided with an axial bore 406 which is reduced at its lower end and forms an annular shoulder 407. This housing is provided with fluid passageways (to be later described), and the valves (to be later described) for said passageways are controllable to be opened and closed by the operator from without the well bore. Preferably, the operator will desire to open and close one of said valves before opening another of said valves in a circulation breaker at some lower level in the well bore so as to establish circulation by short stages, but it is not intended to limit the method of operation at all times to short stages or to opening and closing the passageway in one circulation breaker before opening the passageway in another circulation breaker.

Slidable within the bore 406, of the housing 400, is a valve control 408' used to position a valve, which control includes an elongate sectional sleeve 408. The upper section 409, of the sleeve 408, is screw-threadedly attached to the upper end of the lower section 410. The extreme upper end of the section 409 slides within the enlarged portion of the adapter 402, so as to abut the annular shoulder 404. A plurality of slots 411 are provided in the upper end of said section, and normally have their outer surfaces closed by the adapter 402 as shown in Fig. 1. It is pointed out that said slots are cut at an upwardly extending angle so that fluid passing through said slots must travel in an upward direction. Below the slots 411, the outer circumference of the sleeve is provided with a spiral groove 412, said spiral portion of the sleeve 409 being enlarged and sliding within the bore 406 of the housing 400. The section 410 is connected at a point opposite the spiral groove, or in close proximity thereto.

The housing 400 is provided with a plurality of openings or fluid passageways 413 which establish communication between the interior and exterior of said housing. Slidable within the bore 406, of the housing 400, and confined between said housing and the section 410 is a sleeve 414 which has its upper end enlarged and slidably engaging both the section 410 and the housing 400. The central portion of the sleeve 414 is provided with slots 415, and said sleeve at this portion is reduced. Projecting within the sleeve 414, and screw-threadedly attached to the housing 400, is a stop pin 416, which will obviously limit the vertical movement of the sleeve 414 because the inner end of said pin projects within the slot 415. Below the slots 415, the sleeve 414 is provided with a plurality of a pair of annular grooves 417'. The section 410, of the sleeve 408, has its outer circumference reduced, forming an annular seat or shoulder 418.

A retaining ring 419 normally abuts the shoulder 418 and the lower end of the sleeve 414. A similar retaining ring 420 normally rests upon the shoulder 407, of the housing 400, and on the annular seat above the lower end 421 of the section 410. Confined between said retaining rings is a coiled, compressed spring 422. The upper enlarged portion 423 is provided with a plurality of packing rings 424 which normally lie on either side of the openings 413, thereby packing off so that fluid cannot enter or escape through the openings 413. Confined between the lower end of the section 409 and the enlarged portion 423 of sleeve 414 is a coil spring 425. In the inner surface of the housing 400, and opposite the coil spring 425, there is provided a plurality of enlarged screw threads 426. The section 410 of the sleeve 408, near its lower portion, is provided with a plurality of openings 427, and movably confined within said openings are balls 428 which ordinarily abut the partition between the two annular grooves 417 and 417'.

It is pointed out that the circulation breaker assembly is in the position shown in Fig. 1 when it is inserted in the well, and remains in this position during normal operations of the well. However, any means, such as the member C, a core barrel, or the like, (not shown) may be run into the well and will strike the balls 428. The core barrel, or the like, by its own weight or by normal pump pressure, will force the sleeve 408 downwardly, and the balls 428 will drop into the lower circular groove 417, thereby allowing the core barrel or other tool to pass through said circulation breaker. When said core barrel, or other tool, is withdrawn, it strikes the balls 428, moving the sleeve 408 upwardly and allowing the balls to snap into the upper groove 417', and the tool may then pass up through said circulation breaker.

In the event cuttings or other materials lodge around the pipe, and the pipe becomes stuck in the well, it is desirable to break normal circulation and to reestablish a circulation to wash around the outer circumference of the stuck pipe so as to wash the earth or binding material away from such stuck pipe.

In accordance with my invention, there may be placed at any suitable intervals within the string of pipe or tubing, circulation breakers generally indicated by B, Fig. 17. For example, the depth of the well may be 5,000 feet, and one of such circulating breakers could be placed at five-hundred-foot intervals so that there would be five to eight of such circulation breakers in the string of pipe. If while drilling, the pipe becomes stuck, the operator usually in such instances does not desire to disconnect the pipe if he can reestablish circulation around the same, thereby freeing it. An example of the method to operate the circulation breaker is to open and close the valves 409, 423 in one or more of these breakers so as to reestablish circulation. There has been shown in the drawings a member C which is commonly referred to as a "go-devil." As the go-devil strikes the first circulation breaker and comes to rest upon the balls 428 its weight is just enough to move the parts to the positions shown in Fig. 2, thereby moving the sleeve 408 downwardly until the spiral groove 412 is opposite the screw-threaded portion 426 of the housing 400. The purpose of the spiral groove 412 and threads 426 is to set up a turbulence in the fluid stream that may be forced to flow out through the openings 413, and thereby create an extra down thrust on the sleeve 408 by impinging upon the grooves 412. This down thrust will be slight unless the volume and rate of flow of the fluid stream is high as it will be when the cuttings are circulated out of the well above the open passageways 413. The screw-threaded portion 426 and the groove 412 will then create a greater turbulent effect and will act to force said sleeve 408 downwardly. Further, in the event particles of mud, or the like, enter the slots 411, they will be carried down and around the spiral grooves and threads. The spring 425 will move the enlarged portion 423 of the sleeve 414 downwardly as the pressure upon the spiral grooves 412 is increased. All this will move the ring 419 downwardly and compress the spring 422. The circulation breaker will now be in the position shown in Fig. 2.

The ports 413 have now been opened and thereby fluid may pass from the bore of the tubing through the slots 411 and through the annular grove 412 and threads 426, out through the ports 413 and up the outside of the pipe or tubing. Thus the operator has established circulation around this upper portion of the stuck pipe, and he may now desire to move to the next circulation breaker to establish communication at that point. In order to do this, it is necessary to increase the pump pressure and volume which will act upon the sleeve 408, thereby moving said sleeve downwardly and allowing the balls 428 to move into the lower groove 417, as shown in Fig. 6. The lower shoulder of enlarged portion 423 is resting upon the pin 416 (Fig. 2) and therefore the sleeve 414 cannot be moved down further. Thus the sleeve 408 will move downwardly, allowing the go-devil C to pass through the upper circulation breaker. The go-devil C is moved by gravity down through the fluid to the next circulation breaker, and the steps are repeated until circulation has been established down to the second breaker, and this is repeated until the entire string of tubing has been freed. After the go-devil or a tool has passed through a circulation breaker, the springs 422 and 425 expand and return the parts to the position shown in Fig. 1 and the valve closes the passageways 413. In some instances, it may be found desirable to operate the valve in the breaker by other means, and any suitable means may be used. At times it is desirable to retract said go-devil or to run into the well or to remove from the well a core barrel or other device. As the go-devil, or other device, is pulled upwardly, the same will strike the balls 428, and, by an upward movement, the pin 416 will hold the sleeve 414 and allow the sleeve 408 to move upwardly, thereby allowing the balls 428 to drop into the upper groove 417 and allow said go-devil to be retracted (Fig. 7). Thus there is provided a circulation breaker or by-pass valve device which does not restrict the bore of the tubing and which can be easily and efficiently operated.

Another form of the circulation device is shown in Figs. 9, 10 and 11. The numeral 450 designates a sectional tubular housing. The upper portion 451 of said housing has its upper end internally screw-threaded and its lower portion reduced and externally screw-threaded. The lower portion 452 of said housing is screw-threadedly attached to the lower end of the portion 451, and the lower end of the portion 452 is reduced and externally screw-threaded so that a tubular pipe 453 may be attached thereto. It is pointed out that a tubular pipe 454 may be attached to the upper end of the portion 451 of the housing 450. Thus the housing may be connected into a string of tubing.

The portion 451 of the housing is provided with an axial bore 455. A plurality of ratchet teeth 456 are provided on the walls of said bore. An annular seat 457 is provided on the lower portion of the lower end of the housing 451 surrounding the bore 455. The housing 452 is provided with an axial bore 458 therein, the bore is enlarged at 459 and further enlarged at 460 at the upper end of the portion 452. A valve head 461 has a valve face 462 on its upper periphery and seats upon the valve seat 457 located on the lower end of the housing 451. A sleeve 463 depends from said valve head and has its lower end extending into the enlarged bore 459. The head and sleeve have an axial bore 464 extending therethrough. The head 461 is slidable within the enlarged bore 460, while the sleeve 463 is slidable within the bore 459. A coiled spring 465 surrounds the sleeve 463 and has its upper end underlying the head 461, and its lower end resting upon the bottom of the enlarged bore 460. Thus said spring supports the head.

A plurality of orifices 466 are provided in the housing 452 at its reduced portion so that they establish communication between the enlarged bore 460 and the exterior of the housing 452. A disk 467 is disposed above the head 461 and has an axial opening 468 therethrough. Said disk is provided with a plurality of upwardly-extending, flexible fingers 469 which have their uppermost ends 470 bent outwardly so that they may engage within the ratchet teeth 456. Thus the spring 465 will support the head and will close the valve seats 457 and 462 so that any fluid passed through the device must flow through the sleeve 463.

In operation, the bore of the device is unrestricted so that any tool may be passed therethrough. In the event the string of tubing becomes lodged or stuck in the well bore and it is desirable to attempt to establish circulation around said pipe, it is only necessary to drop or run into the well bore a suitable tool to close the bore of the sleeve 463. In the drawings, a ball 471 has been shown, however, a go-devil or the like may be dropped or run in or a wire line so as to close said bore. With the bore closed, pump pressure is applied to said disk and plugging means and the disk and head are moved downwardly. It is pointed out that when the disk is moved downwardly, the fingers will also move downwardly, and the upper bent ends of said fingers engaging the teeth 456 will hold the disk in that position (Fig. 10) so that the spring cannot move the head upwardly. The washing fluid is free to pass between the fingers and into the bore 460 and out through the orifice 466, thus washing the exterior of the pipe. It is pointed out that said fingers and teeth may be left out of said structure and in this instance the pressure of the fluid may be depended upon to hold said head in its downward or ajar position.

This application is a division of my co-pending application, Serial No. 334,947, filed May 13, 1940, now Patent No. 2,394,759, granted February 12, 1946, for Method of Recovering Elements From Well Bores.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device for use in establishing partial circulation in a well bore, the combination including a tubular body, a passageway in the wall of said body, a sleeve valve for the passageway slidably mounted in said body, means to move said valve to a position opening said passageway and means to normally urge the sleeve valve into position closing said passageway during normal operations, said first means including a sleeve mounted within said valve and extending thereabove, interconnecting means between said valve and said sleeve, and members carried by said sleeve and projecting into the bore of said sleeve, said sleeve being spaced from said body above said valve to form a fluid passageway.

2. In a by-pass valve device, the combination comprising a housing, ports in said housing, a sleeve valve slidably mounted in said housing normally closing said ports, a sleeve mounted within said sleeve valve, said sleeve extending above and below said sleeve valve, said sleeve being spaced from said housing above said valve to form a fluid passageway, a spring mounted between the upper end of said sleeve valve and a spring seat on said sleeve, whereby downward movement of said sleeve causes downward movement of said sleeve valve, and means carried by said sleeve and projecting into the bore of said sleeve for engagement with a tool for moving said sleeve downwardly.

3. A by-pass valve device comprising a housing, ports in said housing, a sleeve valve slidably mounted in said housing normally covering said ports, a sleeve mounted within said sleeve valve, said sleeve extending above and below said sleeve valve, said sleeve being spaced from said housing above said valve to form a fluid passageway, a spring mounted between the upper end of said sleeve valve and a spring seat on said sleeve, a second spring being mounted between a spring seat in said housing and a spring ring that jointly engages the lower edge of said sleeve valve and a shoulder on said sleeve, and means carried by said sleeve and projecting into the bore of said sleeve for engagement with a tool for moving said sleeve and valve.

4. In a by-pass valve device, the combination comprising a housing, ports in said housing, a sleeve valve slidably mounted in said housing normally covering said ports, a sleeve mounted within said sleeve valve, said sleeve being spaced from said housing above said valve to form a fluid passageway, spring means mounted between said sleeve valve and said sleeve, the upper part of said sleeve being provided with slots that extend radially outward and upwardly.

5. In a by-pass valve device, the combination comprising a housing, ports in said housing, a sleeve valve slidably mounted in said housing normally covering said ports, a sleeve mounted within said sleeve valve, said sleeve being spaced from said housing above said valve to form a fluid passageway, spring means mounted between said sleeve valve and said sleeve, said sleeve having spiral grooves therein, such grooves being located adjacent the upper end of said sleeve, and upon the exterior surface thereof.

6. In a by-pass valve device, the combination comprising a housing, ports in said housing, a sleeve valve slidably mounted in said housing normally closing said ports, a sleeve mounted within said sleeve valve, said sleeve being spaced from said housing above said valve to form a fluid passageway, spring means mounted between said sleeve valve and said sleeve, said sleeve having spiral grooves therein, such grooves being located adjacent the upper end of said sleeve, and upon the exterior surface thereof, said housing having spiral grooves therein upon its interior surfaces, these last named grooves lying opposite to and cooperating with said first named grooves when said ports are opened by said sleeve valve.

7. In a by-pass valve device, the combination comprising a housing, ports in said housing, a sleeve valve slidably mounted in said housing normally closing said ports, a sleeve mounted within said sleeve valve, said sleeve being spaced from said housing above said valve to form a fluid passageway, spring means mounted between said sleeve valve and said sleeve and between said sleeve valve and said housing, grooves on the interior surface of said sleeve valve and members carried by said sleeve normally projecting into the bore of said sleeve but movable into said grooves.

8. In a by-pass valve device, the combination comprising a housing, ports in said housing, a sleeve valve slidably mounted in said housing normally closing said ports, a sleeve mounted within said sleeve valve, said sleeve being spaced from said housing above said valve to form a fluid passageway, spring means mounted between said sleeve valve and said sleeve and between said sleeve valve and said housing, spaced grooves on the interior surface of said sleeve valve, a series of balls circumferentially mounted in said sleeve, said balls extending radially inward and outward beyond the inner and outer surfaces of said sleeve, and adapted to be moved into said grooves.

9. In a by-pass valve device, the combination comprising an exterior housing, ports extending therethrough, a sleeve valve slidably engaging an interior surface of said housing, a sleeve mounted within said sleeve valve, said sleeve being spaced from said housing above said valve to form a fluid passageway, a spring mounted between said housing and said sleeve and below said sleeve valve and normally urging said sleeve valve upwardly into a position that prevents circulation between the bore of said housing and the exterior thereof through said ports.

CHARLES R. EDWARDS.

REFERENCES CITED

The following references are of record in the file of this patent:

UNITED STATES PATENTS

| Number | Name | Date |
|---|---|---|
| 1,607,481 | Ross et al. | Nov. 16, 1926 |
| 1,648,377 | Crowell | Nov. 8, 1927 |
| 1,684,551 | Manning | Sept. 18, 1928 |
| 1,883,071 | Stone | Oct. 18, 1932 |
| 2,118,350 | Holt | May 24, 1938 |
| 2,122,751 | Phipps | July 5, 1938 |
| 2,128,352 | Creighton | Aug. 30, 1938 |
| 2,210,815 | Linney | Aug. 6, 1940 |
| 2,214,550 | Edwards | Sept. 10, 1940 |
| 2,244,124 | Shemeley | June 3, 1941 |
| 2,394,759 | Edwards | Feb. 12, 1946 |
| 2,462,477 | Edwards | Feb. 22, 1949 |